April 9, 1946.   J. F. KENDRICK   2,398,145
AIRPLANE LANDING GEAR
Filed Aug. 18, 1944

Inventor
John F. Kendrick

By M. B. McDaniel
Attorney

UNITED STATES PATENT OFFICE 2,398,145

AIRPLANE LANDING GEAR

John F. Kendrick, Elizabeth, N. J.

Application August 18, 1944, Serial No. 550,054

9 Claims. (Cl. 244—103)

This invention relates to apparatus for effecting positive rotation of airplane landing wheels while an airplane is in flight and immediately prior to landing, whereby to reduce excessive wear on the part of the inflated tires for such wheels.

It has been recognized that excessive wear of rubber tires of airplane landing wheels occurs as a result of the frictional scraping or dragging of the tires over the ground immediately after the airplane alights and until the time the rotational speed of the wheels is equivalent to that of the forward movement of the plane. During flight, the wheels are stationary and when the airplane descends its ground speed is quite high. It is, therefore, evident that frictional drag of the wheels over the ground surface is produced, causing undesirable tire wear.

In my prior application, Serial No. 457,681, filed September 8, 1942, of which this application is a continuation-in-part, I have disclosed means for rotating the landing wheels of an airplane in which the tire-receiving body of each wheel is provided on its inner side, and near its outer periphery, with impeller vanes arranged in circular order and adjacent to a relatively stationary closure plate, the latter being provided with alternately located air inlet and discharge nozzles which, when the plane is in flight, cause air streams moving at high velocity to impinge the impeller vanes with sufficient force and energy to cause the desired positive rotation of the airplane wheels.

Experience has disclosed that under certain conditions, the formation of ice between the stationary nozzle plate and the rotatable wheel body causes the latter to adhere to the plate so that rotation of the wheel is prevented. Thus, if the landing wheels are locked against rotation by ice formation, the usefulness of the rotating mechanism is lost and a landing hazard presented, in that the locking of the wheels may cause an alighting plane to tip over on its nose in addition to producing tire drag on the ground.

Therefore, while it is necessary to use a stationary nozzle plate to produce the impinging air streams on the impeller vanes of the propeller body, the present invention provides for the release and rotation of the nozzle plates in the event of the icing conditions above noted, means being present to normally restrain or hold the plate against rotation but to automatically release the plate for rotation in unison with the wheel body in the event ice, dust or other conditions may be present, tending to lock the plate and the associated wheel body together.

The object of the invention, therefore, is to provide a pneumatic turbine means for positively rotating the landing wheels of an airplane and wherein provision is made for permitting the stator of the turbine to revolve with the rotor member in the event of the presence of ice or other conditions preventing normal relative movement between the rotor and stator members.

For a further understanding of the invention, reference is to be had to the following description and the accompanying drawing, wherein.

Figure 1:
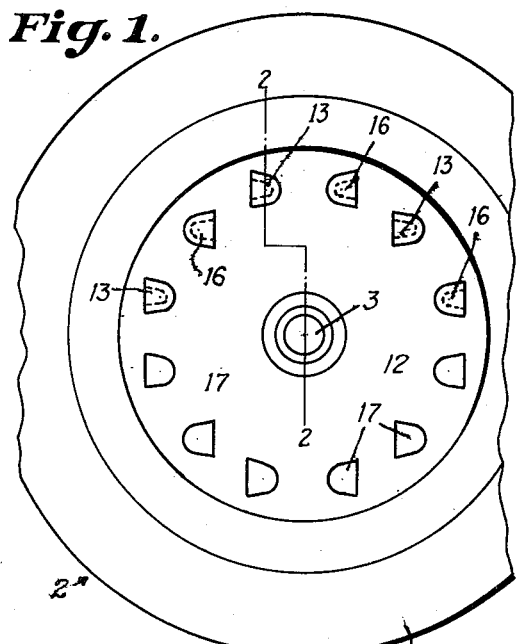
Fig. 1 is a fragmentary front elevational view of an airplane landing wheel constructed in accordance with the present invention.
Figure 2:
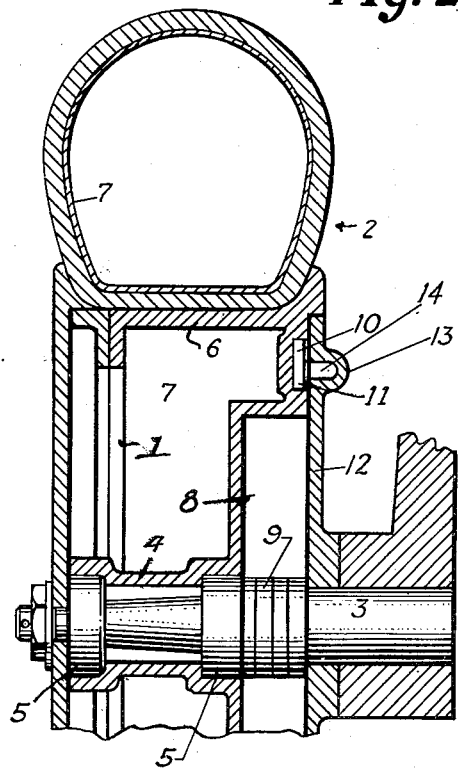
Fig. 2 is a vertical transverse sectional view on the plane indicated by the line 2—2 of Fig. 1.

Referring more particularly to the drawing, the numeral 1 designates the metallic body of the landing wheel 2 of an airplane. The numeral 3 designates the strut supported stud axle on which the wheel 2 is mounted for rotation, the hub 4 of the wheel being supported from the axle on antifriction, thrust-absorbing bearings 5. The struts employed to effect the support of the axle and its associated wheel may be of the fixed type, or of the so-called retractile type, as will be readily understood. The outer portion of the wheel body is formed with the usual felly or rim 6 adapted for the reception of an inflatable tire 7. The inner face of the wheel body 1 is recessed, as usual, as at 8, for the reception of internal brake mechanism 9. Thus, the wheel body, its mounting and associated tire are of standard construction and may comprise any one of the many types now conventionally employed on airplanes.

Figure 3:
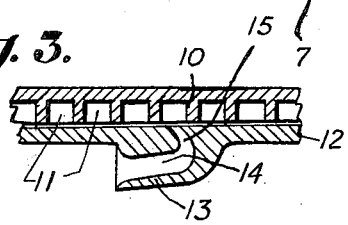
Fig. 3 is a detail horizontal sectional view on the line 3—3 of Fig. 1, showing one of the air inlet nozzles.
Figure 4:
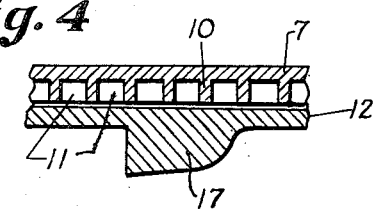
Fig. 4 is a similar view on the line 4—4 of Fig. 1, showing one of the counterweighting enlargements on the nozzle plate.

The inner side of the wheel body 1, contiguous to the rim 6, is formed with an annular series of turbine blades or vanes 10, between which pockets 11 are formed. For convenience in illustration, these blades or vanes have been shown as straight radial elements, but other desired configurations may be used. The pockets 11 are covered by a stationary nozzle plate 12 arranged contiguous to the inner side of the wheel body on the axle 3. In this instance, the disk or plate is provided with air inlet nozzles 13 shaped, as shown in Fig. 3, to provide an inwardly converging passage 14 terminating in a restricted throat 15. The nozzles 13 project laterally and horizontally from the main plane of the closure plate and are disposed horizontally on said plate so that the forward open ends of the passages 14 will be positioned to receive air freely from the atmosphere, while the plane is in flight, to cause the air entering the passages to travel at high velocity for impingement on the blades or vanes 10 of the wheel body.

Arranged in alternate relation with the nozzles 13 on the plate 12 are reversely disposed outlet or air-discharging nozzles 16, the open outlets of the nozzles 16 facing rearwardly with respect to the direction of airplane flight, in order to produce negative pressures in the passages of the nozzles 16 to facilitate the discharge of air withdrawn from contact with the turbine vanes 10.

The structure so far described in detail is to be found in my aforesaid application. In my earlier structure, no provision was made for overcoming the effects of ice forming between the wheel body and the nozzle plate. I accomplish this in the present invention in several ways. As shown in Figs. 1 to 4, the lower half of the nozzle plate is provided with weighting enlargements 17 which are integrally formed therewith and possess the configuration of the nozzles shown at 12 and 16. Instead of being cored to form passages therein, as in the case of said nozzles, the enlargements 17 are solid or devoid of passages, thus providing an extra amount of weight on the lower part of each nozzle plate by which said plate is normally maintained stationary and precluded from rotating about the axle 3. In the event of undue adherence between the adjoining surfaces of the nozzle plate and wheel body, as caused, for instance, by ice, the nozzle plate will be free to rotate about the axle 3 in unison with the wheel body, thus, under these emergency conditions, preventing the plane from tipping over on its nose or causing excessive drag friction and skidding of the wheel tires 7. It will be noted that the upper and lower sets of nozzle enlargements, as indicated at 13, 15 and 17, are so proportioned as to balance each other aerodynamically, and therefore the slightly increased weight of the uncored lower enlargements is sufficient to prevent rotation of the plate when there is no additional drag due to ice accumulation or the like.

Figure 5:
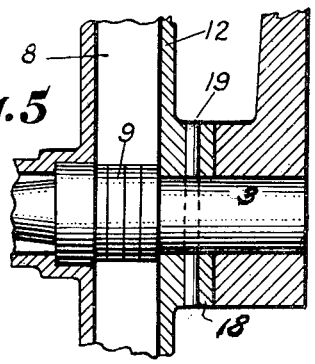
Fig. 5 is a detail vertical sectional view setting forth a modified form of the invention wherein the nozzle plate is secured to the wheel axle by a frangible pin.

Similar results may be obtained, as shown in Fig. 5, by providing the hub 18 of the nozzle plate and the axle 3 with aligned openings for the reception of a frangible pin 19. Under normal conditions, this pin will serve to maintain the nozzle plate stationary, but if the wheel body should become locked to the nozzle plate, the wheel or wheels upon contacting the ground, will produce rotative forces which readily shear the pin 19, thereby releasing the nozzle plate from the axle and permitting it to rotate freely with the associated wheel.

Figure 6:
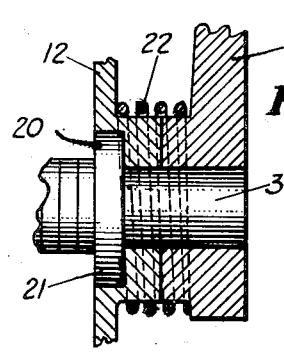
Fig. 6 is a similar view disclosing another modification in which spring pressure is utilized to normally restrain the nozzle plate against rotation.

A third form has been shown in Fig. 6, wherein the axle 3 is provided with a collar 20, the latter being received in a socket 21 provided in the hub portion of the nozzle plate 12. A coil spring 22 of the expansion type is interposed between the hub portions of the plate 12 and the landing gear strut or arm 23. Normally, the spring 22 exerts sufficient pressure on the hub of the plate 12 to maintain the same in positive frictional engagement with the collar 20, thereby restraining the nozzle plate against rotation, but in the event of adherence between the wheel body and nozzle plate, the latter will be free to rotate about the axle 3.

While I have described what I consider to be certain preferred forms of the present invention, nevertheless, it will be understood that the structure is subject to certain variation and modification without departing from the scope of the following claims.

I claim:

1. In airplane landing gear, a wheel having side walls and a tire-receiving body, a plurality of impeller vanes arranged in circular order on at least one of the side walls of said body adjacent to its outer perimeter, an axle for said wheel, a relatively stationary closure member arranged on said axle adjacent to said vanes, air inlet and discharging nozzles carried by said member, and means normally restraining rotation of said closure member relatively to said wheel body but providing for such rotation in the event of undue adherence between the adjoining surfaces of said closure member and wheel body.

2. In airplane landing gear, a wheel having a tire-receiving body, a plurality of impeller vanes arranged in circular order on at least one of the side walls of said body adjacent to its outer perimeter, an axle on which said wheel is supported for rotation, a relatively stationary closure plate mounted on said axle adjacent the side of the wheel body containing said vanes, a plurality of substantially horizontally disposed, alternately situated air inlet and discharge nozzles carried by the upper part of said plate in registration with said vanes, said nozzles being disposed in relatively spaced circular order around the closure plate with the internal air passages of the nozzles disposed in open air flow communication with said vanes, and a plurality of weighting enlargements provided on the lower part of said plate in symmetrical order with said nozzles, said weighting enlargements being devoid of internal passages.

3. Landing wheel construction for airplanes comprising an axle, a tire-receiving wheel body rotatably mounted upon said axle, a circularly disposed row of turbine blades formed on at least one side of said body contiguous to the perimeter thereof, a stationary closure plate positioned on said axle and arranged adjacent to the side of the wheel body containing said blades, said plate being formed with air inlet and discharge passages in registration with said blades, and frangible means uniting said plate with said axle for normally preventing rotation of said plate about said axle, but to release the plate for rotation with the wheel body in the event of undue adherence between the adjoining surfaces of the wheel body and plate.

4. Landing wheel construction for airplanes comprising an axle, a tire-receiving wheel body rotatably mounted upon said axle, a circularly disposed row of turbine blades formed on at least one side of said body contiguous to the perimeter thereof, a stationary closure plate positioned on said axle and arranged adjacent to the side of the wheel body containing said blades, said plate being formed with air inlet and discharge passages in registration with said blades, a shoulder on said axle with which the hub portion of said plate has frictional engagement, and spring means for positively maintaining the hub portion of said plate in frictional engagement with said plate about said axle, but permitting of rotation of the plate in event of adhering engagement between adjacent surfaces of said plate and wheel body.

5. In airplane landing gear, a wheel having a tire-receiving body, a plurality of impeller vanes arranged in circular order on at least one of the side walls of said body adjacent to its outer perimeter, an axle on which said wheel is supported for rotation, a relatively stationary closure plate mounted on said axle adjacent the side of the wheel body containing said vanes, a plurality of substantially horizontally disposed, alternately situated air inlet and discharge nozzles carried by the upper part of said plate in registration with said vanes, said nozzles being disposed in relatively spaced circular order around the closure plate with the internal air passages of the nozzles disposed in open air flow communication with said vanes, and a plurality of weighting enlargements having the configuration of said nozzles provided on the lower part of said plate in symmetrical order with said nozzles, said weighting enlargements being devoid of internal passages.

6. In airplane landing gear, a wheel having sidewalls and a tire-receiving body, a plurality of impeller vanes arranged in circular order on at least one of the side walls of said body adjacent to its outer perimeter, an axle for said wheel, a relatively stationary closure member arranged on said axle adjacent to said vanes, air inlet and discharge nozzles carried by said member, and means normally restraining rotation of said closure member relatively to said wheel body but providing for such rotation in the event of undue adherence between the adjoining surfaces of said closure member and wheel body, said means being aerodynamically balanced and embodying weighting elements provided on the lower half of said closure member.

7. In airplane landing gear, a wheel having sidewalls and a tire receiving body, a plurality of impeller vanes arranged in circular order on at least one of the side walls of said body adjacent to its outer perimeter, a strut carried axle on which said body is rotatably mounted, a relatively stationary closure member rotatably mounted on said axle adjacent to the side of said wheel body containing said vanes, air inlet and discharge nozzles formed with said closure member in registration with said vanes, said relatively stationary closure member rotatably mounted being aerodynamically balanced and pendulously weighted to preclude normally rotation thereof about said axle, said pendulous weighting being so disposed as to automatically return said closure member to its normal position once a rotating force has been removed.

8. In airplane landing gear, a wheel having sidewalls and a tire-receiving body, a plurality of impeller vanes arranged in circular order on at least one of the side walls of said body adjacent to its outer perimeter, an axle for said wheel, an aerodynamically balanced relatively stationary closure member arranged on said axle adjacent to said vanes, air inlet and discharging nozzles carried by said member, and means normally restraining rotation of said closure member relatively to said wheel body but providing for such rotation in the event of undue adherence between the adjoining surfaces of said closure member and wheel body, said means permitting said closure member to automatically assume its normal position once said undue adherence between the adjoining surfaces of said closure member and wheel body has been removed.

9. In an airplane landing gear, a wheel having sidewalls and a tire-receiving body, a plurality of impeller vanes arranged in circular order on at least one of the side walls of said body adjacent to its outer perimeter, an axle for said wheel, a relatively stationary closure member arranged on said axle adjacent to said vanes, air inlet and discharging nozzles carried by said members, and means normally restraining rotation of said closure member relatively to said wheel body but providing for such rotation in the event of undue adherence between the adjoining surfaces of said closure member and wheel body, said means being such as to necessitate the resetting manually of said relatively stationary closure member once said undue adherence between the adjoining surfaces of said closure member and wheel body has been removed.

JOHN F. KENDRICK.